United States Patent [19]

Nomura et al.

[11] 4,454,930
[45] Jun. 19, 1984

[54] APPARATUS FOR CONTROLLING AN AC POWER ELEVATOR

[75] Inventors: Masami Nomura, Nagoya; Hiroyuki Ikejima, Inazawa, both of Japan

[73] Assignee: Mitsubishi Denki Kabushiki Kaisha, Tokyo, Japan

[21] Appl. No.: 418,172

[22] Filed: Sep. 14, 1982

[30] Foreign Application Priority Data

Sep. 28, 1981 [JP] Japan .................. 56-153345

[51] Int. Cl.³ .............................. H02J 9/00
[52] U.S. Cl. ..................... 187/29 R; 307/64; 307/82
[58] Field of Search ............ 187/29; 307/64, 66, 307/70, 82

[56] References Cited

U.S. PATENT DOCUMENTS 4,376,471  3/1983  Uchino et al. .......... 307/64 X
4,381,457  4/1983  Wiles ..................... 307/64

FOREIGN PATENT DOCUMENTS 53-47971  12/1978  Japan .

Primary Examiner—G. Z. Rubinson
Assistant Examiner—W. E. Duncanson, Jr.
Attorney, Agent, or Firm—Wenderoth, Lind & Ponack

[57] ABSTRACT

An apparatus for controlling an AC powered elevator by rectifying a commercial AC power source into a direct current through a rectifier, converting the direct current into a variable frequency AC power through a main inverter, driving the AC motor by the thus converted AC power to operate the cage of the elevator, and sending the regenerated electric power back to the commercial AC power source via a regeneration inverter connected to the DC side of the main inverter when regeneration braking is applied to the electric motor. If the main inverter becomes defective, the main inverter is separated from the electric motor, the AC side of the regeneration inverter is connected to the motor, and the motor is operated by relying upon the regeneration inverter.

3 Claims, 8 Drawing Figures

APPARATUS FOR CONTROLLING AN AC POWER ELEVATOR

BACKGROUND OF THE INVENTION

The present invention relates to an improved apparatus for controlling an elevator which is driven by an AC motor.

According to conventional apparatus of this type, an induction motor is used for driving a cage of the elevator, and AC power whose voltage and frequency may be varied through an inverter, is supplied to the motor to control the running speed.

FIG. 1 is a diagram of an electric circuit of a conventional apparatus for controlling an AC powered elevator, wherein terminals R, S and T are connected to a three-phase AC power source; a rectifier 1 converts a three-phase AC power source voltage into a DC voltage; a smoothing capacitor 2 is connected to the DC side of the rectifier 1; a main inverter 3 of the widely known pulse width modulation type is connected to the DC side of the rectifier 1 and converts a predetermined DC voltage into an alternating current having a predetermined voltage and a predetermined frequency; a separately-excited inverter 4 for regeneration consists of a thyristor connected to both sides of the rectifier 1 and sends the DC power back to the input side of the AC power source; an auxiliary inverter 5 is connected to the DC side of the rectifier 1 and is constructed in the same manner as the main inverter 3; contacts 6a–6c of an electromagnetic contactor are connected to the AC side of the main inverter 3 and are closed when the operation is to be commenced; contacts 6a–6c are opened when the operation is halted and are also opened in case the main inverter 3 becomes defective and a defect detector (not shown) is activated; contacts 7a–7c of an electromagnetic contactor are connected to the AC side of the auxiliary inverter 5 and are normally open but are closed in case the main inverter 3 becomes defective and the defect detector is activated; a three-phase induction motor 8 is connected to the contacts 6a–6c and to the contacts 7a–7c; a drive sheave 9 of a winch is driven by the motor 8; a main rope 10 is wound on the sheave 9; a cage 11 is coupled to one end of the main rope 10, and a balancing weight 12 is connected to the other end of the rope 10.

The contacts 6a–6c of the electromagnetic contactor are closed when the operation is commenced normally and the contacts 7a–7c are opened. Therefore, the motor 8 receives AC power of a voltage and a frequency that may be varied by the main inverter 3. Therefore, the motor 8 is actuated, and the cage 11 runs. When the cage 11 is descending with a heavy load, or is ascending with a light load, or is decelerating, the mechanical energy is converted into electrical energy and is sent back to the DC side via the main inverter 3. Various defects develop if the returned electrical energy is left untreated. The regeneration inverter 4 operates to treat the regenerated electric power, i.e., the inverter 4 sends the electrical power supplied to its DC side back to the three-phase AC power source at terminals R, S, and T.

The main inverter 3 consists of diodes and transistors, and exhibits complex functions such as switching functions and commutation functions. Therefore, in the control apparatus of FIG. 1, trouble mainly develops in the main inverter 3. If trouble develops in the main inverter 3, contacts 6a–6c are opened, contacts 7a–7c are closed, the motor 8 is driven through the auxiliary inverter 5, and the cage 11 stops at the nearest floor.

Since the auxiliary inverter 5 is employed, to maintain safety even in the case where the main inverter 3 becomes defective, the control apparatus becomes complex in construction and becomes expensive.

SUMMARY OF THE INVENTION

The present invention enables the avoidance of the above-mentioned complexity and high cost and its object is to provide a control apparatus for controlling an AC powered elevator, which is simply and cheaply constructed, and which, in the case where the main inverter becomes defective, enables the electric motor to be operated by relying upon a regeneration inverter.

DESCRIPTION OF THE PREFERRED EMBODIMENT

An embodiment of the invention will be described below in conjunction with FIGS. 2 to 4.

Figure 1:
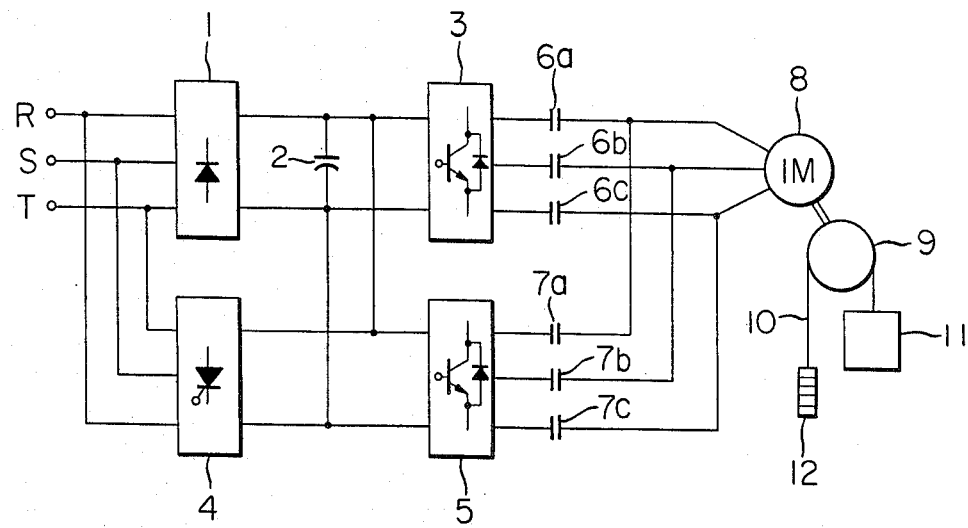
FIG. 1 is a diagram showing the construction of a conventional apparatus for controlling an AC powered elevator.
Figure 2:
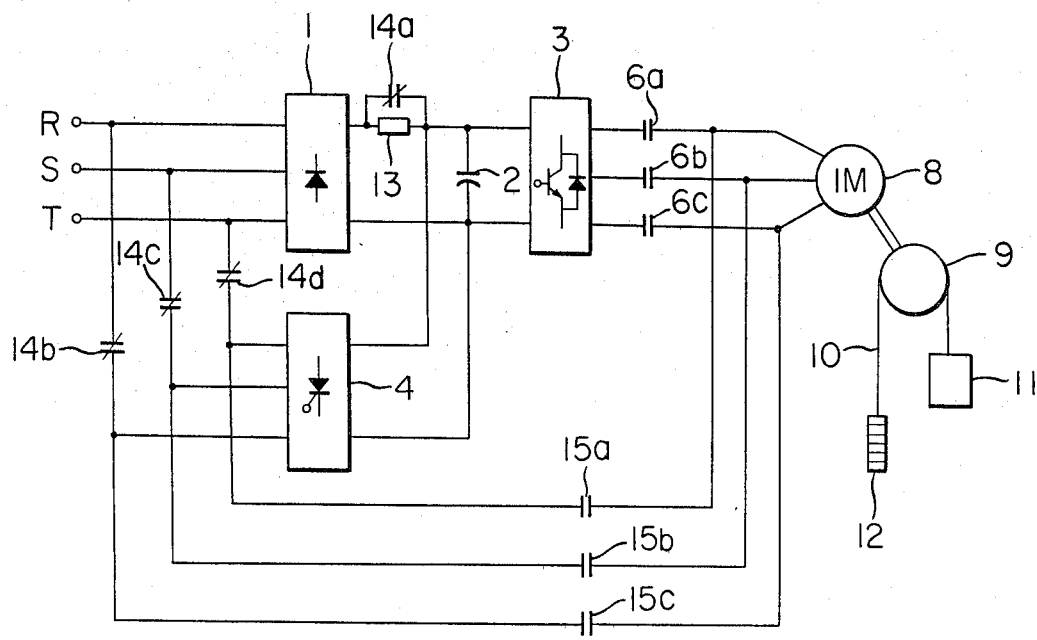
FIG. 2 is a diagram illustrating the construction of an apparatus for controlling an AC powered elevator according to an embodiment of the present invention.

In FIG. 2, a resistor 13 is inserted in a line which connects the rectifier 1 to the main inverter 3. A contact point 14a of an electromagnetic contactor is connected across the two terminals of the resistor 13, and is normally closed; contact 14a opens when the defect detector is operated. Contact points 14b–14d of the electromagnetic contactor are inserted in the lines between the three-phase AC power source connected to terminals R, S, and T and a regeneration inverter 4. Contact points 15a–15c of the electromagnetic contactor are inserted in the lines between the AC side of the regeneration inverter 4 and the electric motor 8, and are closed when the defect detector is activated. Other elements of FIG. 2 are the same as those of FIG. 1.

Figure 3:
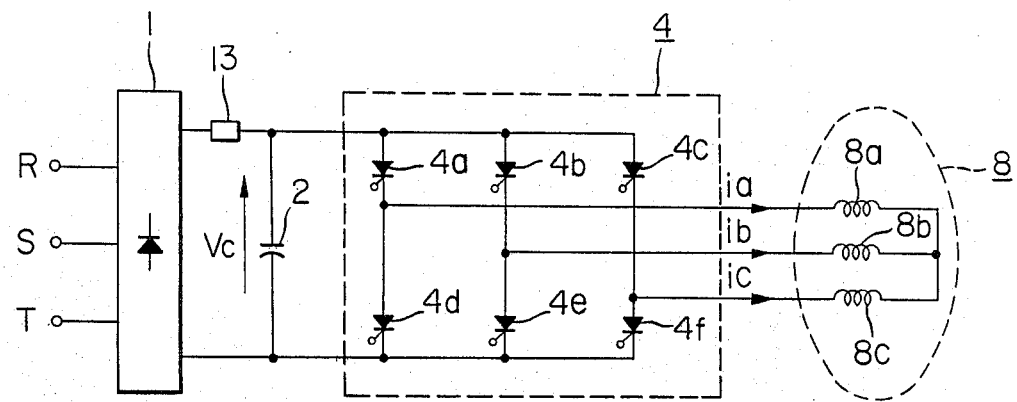
FIG. 3 is a circuit diagram for illustrating the operation principle 1 of the present invention.

FIG. 3 is a circuit diagram of a major portion of FIG. 2, and which operates when the main inverter 3 becomes defective, wherein thyristors 4a–4f constitute the regeneration inverter 4, windings 8a–8c are the windings of the motor 8, $i_a$–$i_c$ denote currents that flow through the windings 8a–8c, and Vc denoted a terminal voltage of the smoothing capacitor 2.

Figure 4:
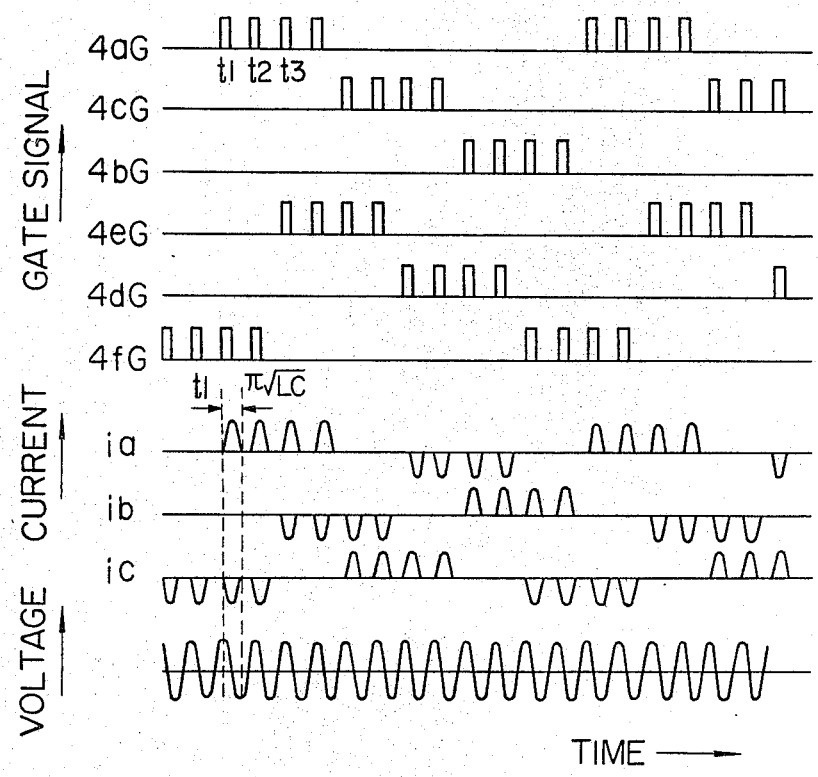
FIG. 4 is a diagram showing waveforms at various points of FIG. 3.

Referring to FIG. 4, pulses 4aG–4fG are supplied to the gates of the thyristors 4a–4f.

Operation of the embodiment of FIG. 3 will be described below.

The contact points 6a–6c and the contact points 14a–14d are closed under normal operation, and operate in the same manner as contact points 6a–6c of FIG. 1.

In case the main inverter 3 becomes defective, the contact points 6a–6c and 14a–14d are opened, and the contact points 15a–15c are closed. Therefore, the DC voltage, rectified by the rectifier 1, is supplied to the regeneration inverter 4 through the resistor 13, and is converted into an alternating current and is supplied to the electric mtor 8 through contact points 15a–15c. The cage 11 is conveyed to the nearest floor as previously noted. The regeneration inverter 4 is of the separately-excited type and does not have a self-exciting capability. The principle for driving the motor 8 by relying upon the separately-excited inverter 4, will be described below with reference to FIGS. 3 and 4.

First, if pulses 4aG–4fG are supplied to the gates of the thyristors 4a and 4f at time $t_1$ in FIG. 4, the electric charge stored in the smoothing capacitor 2 is discharged through thyristor 4a, winding 8a, winding 8c, and thyristor 4f. In this case, due to the electrostatic capacity C of the smoothing capacitor 2 and the reactance L of the windings 8a and 8c, the electric currents $i_a$ and $i_c$ assume the form of a sinusoidal half-wave current having a half period of nearly $\pi\sqrt{LC}$, as shown in FIG. 4. During this period, the terminal voltage Vc of the smoothing capacitor 2 is converted from the positive polarity to the negative polarity, as shown in FIG. 4. After the currents $i_a$ and $i_c$ have becomes zero at a time $(t_1+\pi\sqrt{LC})$, an inverted voltage is applied to the thyristors 4a and 4f to turn them off. When the thyristors 4a and 4f are ignited again at a time $t_2$, a sinusoidal half-wave current flows into the windings 8a and 8c in the same manner as mentioned above. At a time $t_3$, the thyristor 4d is ignited instead of the thyristor 4f, and the current $i_a$ which is allowed to flow into the winding 8a, exits through the winding 8b. Thus, as the thyristors 4a–4f are successively ignited, the currents $i_a$–$i_c$ flow as shown in FIG. 4, and the motor 8 rotates. Since the currents $i_a$–$i_c$ do not flow continuously, vibration may slightly deteriorate the comfort of those being conveyed in the cage 11. The operation of the cage 11, however, is sufficient to rescue the occupants of the elevator cage in an emergency case.

Figure 5:
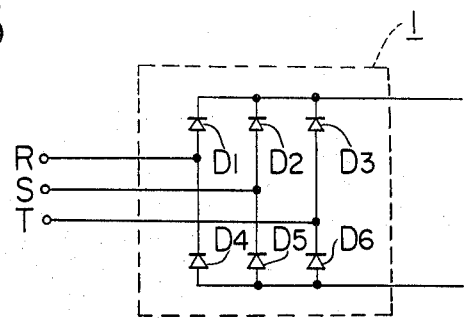
FIG. 5 is a circuit diagram of the three phase rectifier utilized in the apparatus of the present invention.

FIG. 5 illustrates a connectional three-phase rectifier having AC three-phase terminal inputs R, S, and T and +, − DC output lines wherein diodes D1–D6 are utilized as rectifiers.

Figure 6:
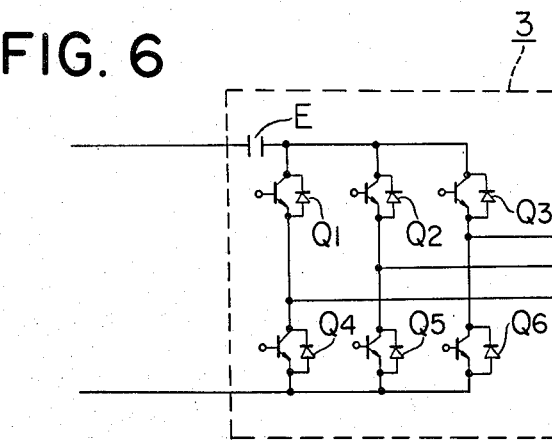
FIG. 6 is a circuit diagram of the main inverter utilized in the apparatus of the present invention.

FIG. 6 illustrates a design of the main inverter 3 wherein transistors Q1–Q6 in conjunction with the diodes connected in parallel are utilized to convert the DC voltage at the input of the unit to modulated pulses at the output of the unit. Contactor E is normally closed and is opened when the defect detector is activated.

Figure 7:
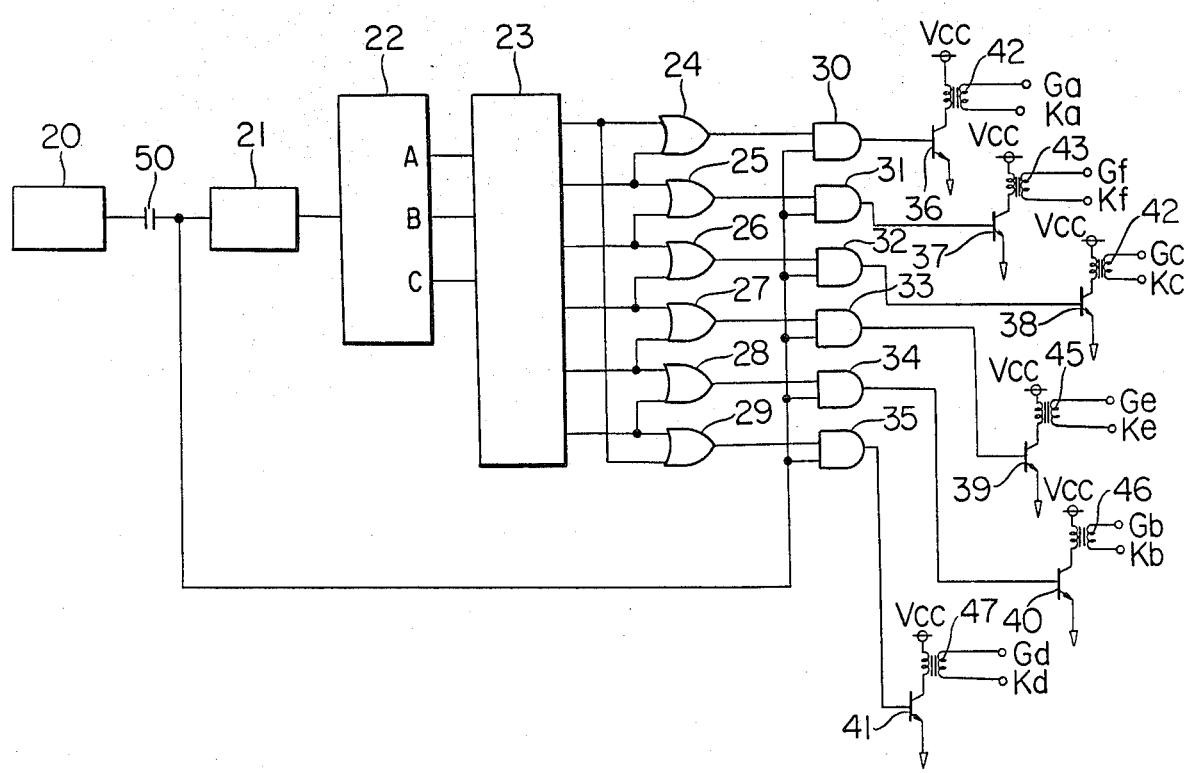
FIG. 7 is a control device for generating control pulses for the regeneration inverter of the apparatus of the present invention.
Figure 8:
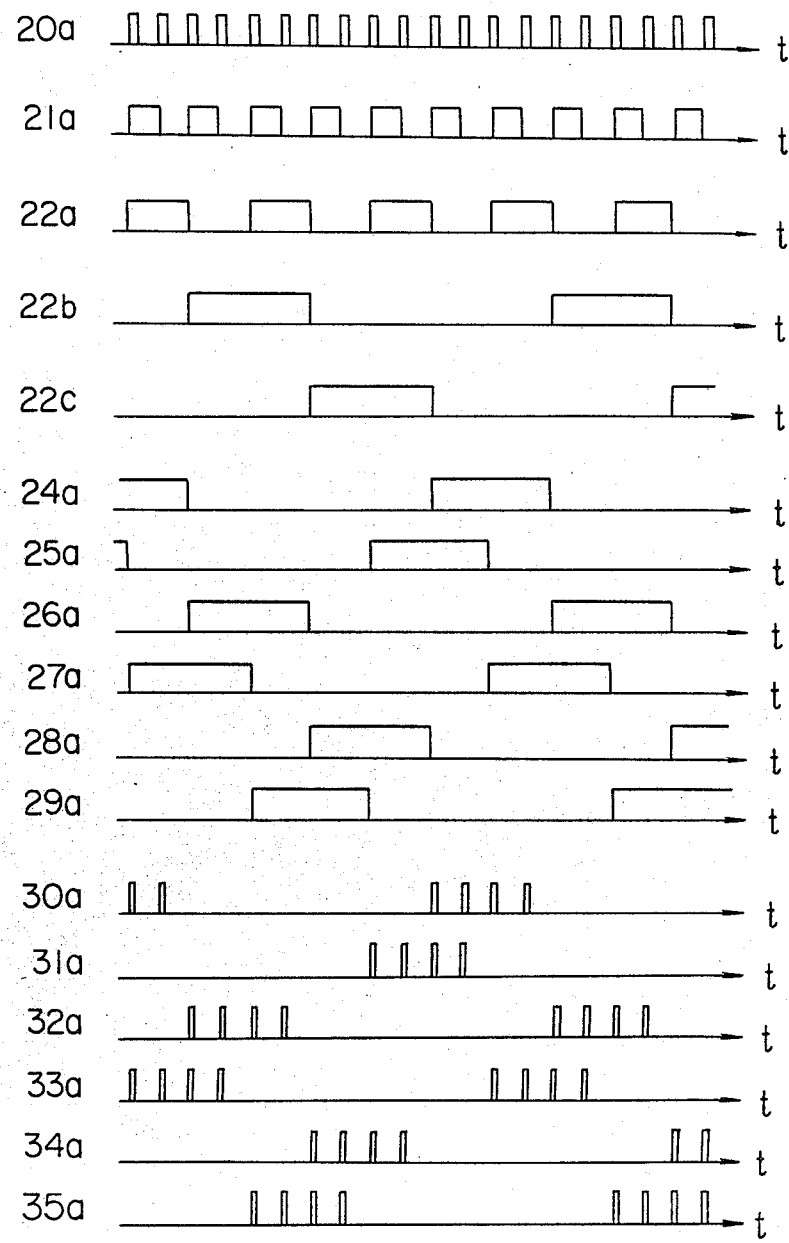
FIG. 8 is a diagram showing the waveforms generated by the control device.

FIG. 7 illustrates the control device utilized for generating the conttol pulses for the regeneration inverter. Pulse generator 20 generates pulses which activate flip flop 21 via contactor 50. Contactor 50 is normally open and is closed when the defect detector is activated. The output of the flip flop 21 connects to the input of a six state counter 22 the outputs of which connect to a decoder 23. The outpus of decoder 23 connect to the input of "or" gates 24–29 the outputs of which connect to the first inputs of "and" gates 30–35 respectively, and the second inputs of which connect to the output of said pulse generator 20. The outputs of "and" gates 30–35 connect to the base inputs of transistor 36–41 respectively. The collector terminals of transistors 36–41 connect to Vcc via the primary windings of pulse transformers 42–47 respectively. The outputs Ga–Gf and Ka–Kf are the control outputs of the control device which connect to the thyristors in the regeneration inverter 4 for the control thereof. The waveform generated in the control device are illustrated in FIG. 8 according the respective markings.

The previously described embodiment has employed a main inverter 3 of the pulse width modulation type as a variable voltage, variable frequency power source. The invention, however, can also be adapted to a voltage-type variable voltage, variable frequency power source employing a regeneration inverter.

According to the present invention, as mentioned above, the main inverter is separated from the electric motor when the main inverter becomes defective, when using a voltage-type variable voltage, variable frequency power source, and the AC side of the regeneration inverter is separated from the commercial AC power supply and is connected to the electric motor. Therefore, if trouble has developed in the main inverter, the electric motor can be run by the regeneration inverter so as to carry out a rescue operation by relying upon a simply and cheaply constructed control apparatus.

What is claimed is:

1. Apparatus for controlling an AC powered elevator having a case and being driven by an AC motor, which comprises:
   a rectifier the input of which connectes to a commercial AC power source for converting said AC power into a regulated DC voltage;
   a main inverter the input of which connects to the output of said rectifier for converting said DC voltage into variable frequency AC power for driving said AC motor;
   a regeneration inverter disconnectingly connected to; the output of said rectifier, said main inverter, said AC motor, and said commercial AC power source for sending the regenerated electric power from said AC motor rack to said commercial AC power source when regeneration braking is applied to said AC motor and for supplying AC power to said AC mtor when a defect detector is activated.

2. Apparatus for controlling an AC powered elevator as set forth in claim 1 wherein said appratus further comprises:
   a first control which is connected on the AC side of said main inverter, said contactor being normally closed under normal operation and opened when said defect detector is activated;
   a second contactor which is connected between the AC side of the regeneration inverter and said AC motor, said contacor being normally open under normal operation and closed when said defect detector is activated;
   a third contactor which is connected between the AC side of said rectifier and the AC side of said regeneration motor, said contactor being normally closed under normal operation and opened when said defect detector is activiated.

3. Apparatus for controlling an AC powered elevator as set fourth in claim 1 wherein:
   said regeneration inverter is of the separately-excited type consisting of thyristors; and
   said contactors are of an electromagnetic type of contactor.

* * * * *